United States Patent
Mannengal et al.

(10) Patent No.: US 12,028,211 B2
(45) Date of Patent: Jul. 2, 2024

(54) DEVICE-SPECIFIC PRE-CONFIGURATION OF CLOUD ENDPOINTS

(71) Applicant: Microsoft Technology Licensing, LLC, Redmond, WA (US)

(72) Inventors: Arun Ramadasan Mannengal, Sammamish, WA (US); Madhavan Kesavan, Redmond, WA (US); Hanumantha Rao Kommalapati, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/867,499

(22) Filed: Jul. 18, 2022

(65) Prior Publication Data
US 2024/0022471 A1    Jan. 18, 2024

(51) Int. Cl.
*H04L 41/084* (2022.01)
*H04L 41/0806* (2022.01)
*H04L 41/0816* (2022.01)

(52) U.S. Cl.
CPC ........ *H04L 41/084* (2013.01); *H04L 41/0806* (2013.01); *H04L 41/0816* (2013.01)

(58) Field of Classification Search
CPC .............. H04L 41/084; H04L 41/0806; H04L 41/0816
See application file for complete search history.

(56) References Cited

U.S. PATENT DOCUMENTS

| | | | |
|---|---|---|---|
| 10,291,477 B1 | 5/2019 | Askar | |
| 10,348,767 B1* | 7/2019 | Lee | H04L 63/0236 |
| 10,812,366 B1* | 10/2020 | Berenberg | H04L 41/0895 |
| 11,455,181 B1* | 9/2022 | Hashmi | G06F 9/45533 |
| 11,551,005 B1* | 1/2023 | Arsanjani | G06F 40/289 |
| 2004/0208191 A1* | 10/2004 | Rajsic | H04L 12/56 370/409 |
| 2018/0041425 A1* | 2/2018 | Zhang | H04W 64/00 |
| 2019/0007463 A1* | 1/2019 | Pelton | H04L 65/80 |
| 2020/0053540 A1* | 2/2020 | Dames | H04L 67/143 |
| 2020/0235994 A1 | 7/2020 | Rusev et al. | |
| 2021/0006642 A1* | 1/2021 | He | H04L 43/0817 |
| 2021/0218551 A1* | 7/2021 | Moriarty | H04L 63/20 |
| 2022/0012030 A1* | 1/2022 | Wang | G06F 8/60 |

OTHER PUBLICATIONS

"International Search Report and Written Opinion Issued in PCT Application No. PCT/US23/024499", dated Sep. 18, 2023, 10 Pages. (MS# 411930-WO-PCT).

* cited by examiner

*Primary Examiner* — Michael Won
(74) *Attorney, Agent, or Firm* — Workman Nydegger

(57) ABSTRACT

The pre-configuring of a set of cloud endpoints to connect to a device in response to receiving a request that cloud endpoints be pre-configured for connection to the device. The request is used to identify the set of cloud endpoints that is to be so pre-configured. Then, a pre-configuration instruction is formulated that is structured to be interpretable by each cloud endpoint to establish device-specific connection configuration that is specific to the device. Furthermore, the pre-configuration is structured to assist the respective cloud endpoint to establish a connection with the device upon request of the device. The pre-configuration instruction is then sent to each cloud endpoint in the set of cloud endpoints, causing the pre-configuration to occur. Thus, subsequent connection to the device is more efficient.

17 Claims, 7 Drawing Sheets

DEVICE-SPECIFIC PRE-CONFIGURATION OF CLOUD ENDPOINTS

BACKGROUND

Internet of Things (IoT) devices can often connect into a cloud computing environment (such as a public, private, or hybrid cloud) in order to provide information and/or consume cloud services. As an example, an IoT device could be a sensor, an appliance, a Global Positioning System (GPS) tracker, and so forth. For instance, sensors such as temperature sensors, flood sensors, contact sensors, break sensors, vibration sensors, and so forth, may be distributed throughout a building and report various parameters being sensed within the building. A cloud service may then process and/or record the reports. As another example, a GPS tracker may report GPS coordinates to a cloud service that records and/or processes the position information.

An IoT device conventionally connects to a cloud computing environment to a particular cloud endpoint (which is also called a "cloud gateway"). A cloud computing environment can have multiple cloud endpoints. However, a device is typically pre-configured to connect to a particular cloud endpoint using a particular protocol. When the device powers up, this hard-coded pre-configuration information is used by the device to connect to that particular cloud endpoint with that particular protocol. In this case, the device is said to have an affinity with that particular cloud endpoint. The protocol used is typically a low power protocol if the device itself is not hard-wired to a power source.

Some IoT devices, such as GPS trackers, may move geographically. In that case, the amount of time and power required to connect through that same particular cloud endpoint may increase as distance of the GPS tracker from the particular cloud endpoint increases. In this case, the IoT device may switch cloud endpoints used to connect to the cloud computing environment. This involves various communications to coordinate connection between the IoT device and the new cloud endpoint.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with the principles described herein, the time and power required for a device to change cloud endpoints is reduced by at least partially pre-configuring a set of cloud endpoints for specific connection with the device. Furthermore, since the set of cloud endpoints is selected ahead of time, computer processing may be devoted to careful selection of the set of cloud endpoints so as to maximize security and privacy of the device when and if the device ultimately connects to one of the cloud endpoints. Furthermore, the selection may take into consideration restrictions in what cloud endpoint the device is permitted to connect to in order to preserve information within geographic bounds. Such restriction on the flow of information may even be a legal requirement.

The principles described herein relate to at least partially pre-configuring a set of cloud endpoints to connect to a device in response to receiving a request that a plurality of cloud endpoints be pre-configured for connection to the device. The request is used to identify a set of cloud endpoints that is to be at least partially pre-configured to establish a connection with the device. Then, a pre-configuration instruction is formulated that is structured to be interpretable by each cloud endpoint to establish device-specific connection configuration that is specific to the device. The pre-configuration is structured to assist the respective cloud endpoint to establish a connection with the device upon request of the device. The pre-configuration instruction is then sent to each cloud endpoint of the set of cloud endpoints, causing all or at least some of the cloud endpoints to at least partially pre-configure for connection to the device.

Thereafter, if the device requests connection to any of the pre-configured endpoints, the pre-configuration may be used by the respective cloud endpoint to facilitate efficient, rapid, and low power connection to the cloud endpoint. Thus, the principles described herein facilitate efficient transition of a device from one cloud endpoint to the next. This might be helpful if the device is moving or as cloud endpoints have reduced performance.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In accordance with the principles described herein, the time and power required for a device to change cloud endpoints is reduced by at least partially pre-configuring a set of cloud endpoints for specific connection with the device. Furthermore, since the set of cloud endpoints is selected ahead of time, computer processing may be devoted to careful selection of the set of cloud endpoints so as to maximize security and privacy of the device when and if the device ultimately connects to one of the cloud endpoints. Furthermore, the selection may take into consideration restrictions in what cloud endpoint the device is permitted to connect to in order to preserve information within geographic bounds. Such restriction on the flow of information may even be a legal requirement.

The principles described herein relate to at least partially pre-configuring a set of cloud endpoints to connect to a device in response to receiving a request that a plurality of cloud endpoints be pre-configured for connection to the device. The request is used to identify a set of cloud endpoints that is to be at least partially pre-configured to establish a connection with the device. Then, a pre-configuration instruction is formulated that is structured to be interpretable by each cloud endpoint to establish device-specific connection configuration that is specific to the device. The pre-configuration is structured to assist the respective cloud endpoint to establish a connection with the device upon request of the device. The pre-configuration instruction is then sent to each cloud endpoint of the set of cloud endpoints, causing all or at least some of the cloud endpoints to at least partially pre-configure for connection to the device.

Thereafter, if the device requests connection to any of the pre-configured endpoints, the pre-configuration may be used by the respective cloud endpoint to facilitate efficient, rapid, and low power connection to the cloud endpoint. Thus, the principles described herein facilitate efficient transition of a device from one cloud endpoint to the next. This might be helpful if the device is moving or as cloud endpoints have reduced performance.

Figure 1:
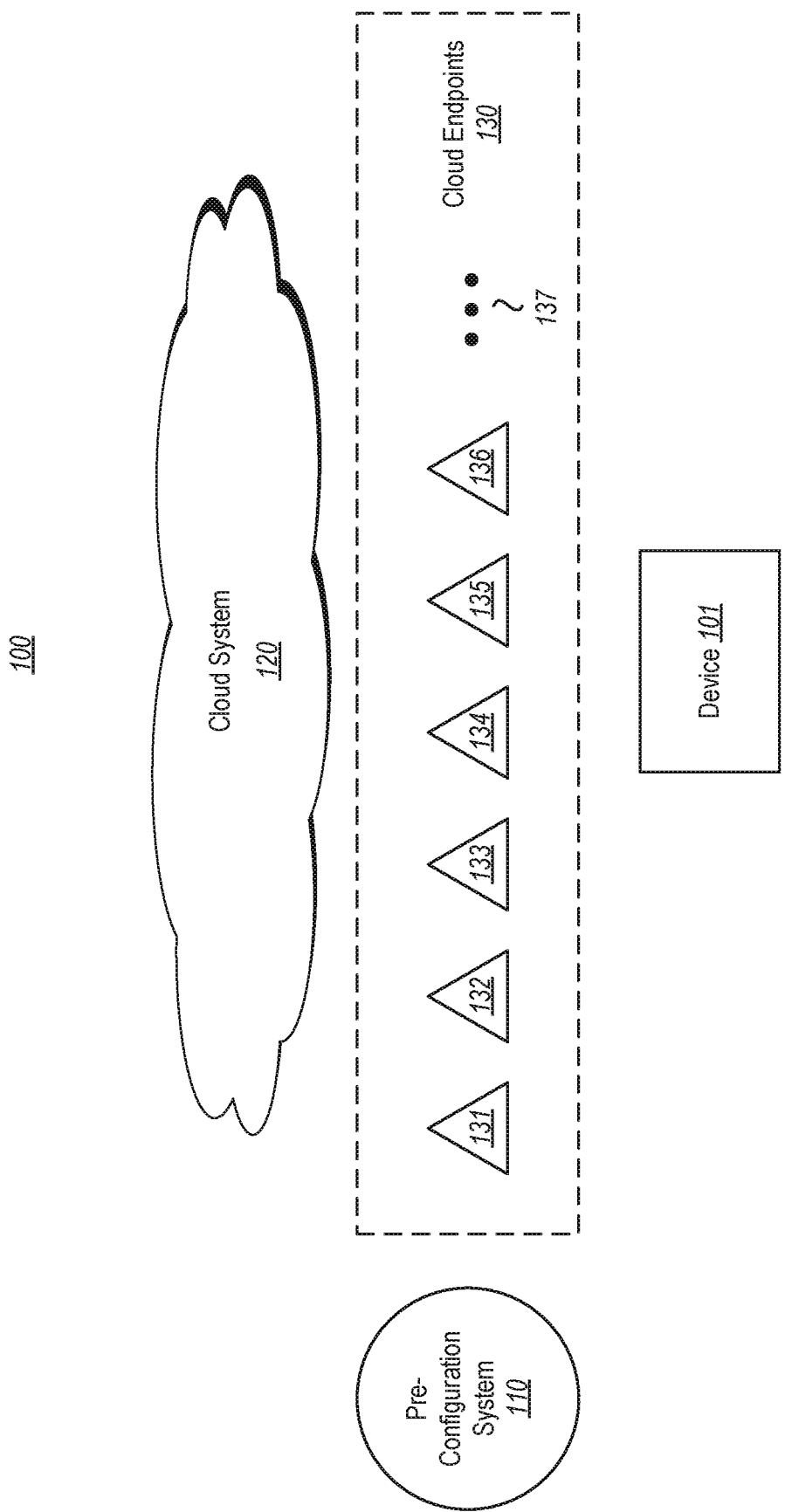
FIG. 1 illustrates an example environment in which the embodiments described herein may operate, which includes a pre-configuration system that coordinates the pre-configuration of cloud endpoints, and a cloud system having a plurality of cloud endpoints.

FIG. 1 illustrates an example environment 100 in which the principles described herein may operate. The environment 100 includes a pre-configuration system 110 that coordinates the pre-configuration described herein, a device 101 for which pre-configuration is being performed, and a cloud system 120 having a plurality of cloud endpoints 130.

The cloud system 120 may be any cloud system including, for example, a public cloud, a hybrid cloud, a private cloud, or any other type of cloud computing system. The cloud system 120 may provide any number of cloud services (not shown). To allow external systems to use such cloud services, the external systems connect to the cloud system 120 using one or more of the cloud endpoints 130.

The cloud system 120 may have any number of cloud endpoints 130, which are illustrated symbolically in FIG. 1 as triangles. In FIG. 1, the cloud system 120 is illustrated as having six cloud endpoints 131 through 136. However, the ellipsis 137 represents that the principles described herein are not limited to how many cloud endpoints the cloud system 120 uses to communicate to and/or from outside of the cloud system 120. In a distributed cloud system, the cloud system 120 may have numerous cloud endpoints.

Each cloud endpoint has a geographic location, and thus is more suitable for connection to external devices that exist within a certain proximity to that cloud endpoint. As an external device increases physical distance from a particular cloud endpoint, the connection performance between the external device and that cloud endpoint can deteriorate. As an example, the communications that use that connection may have more latency, require more retries, require more buffering, or even perhaps fail altogether. Furthermore, since communications are less efficient as connection performance decreases, the power consumed by the external device is increased.

Some portions of the environment 100 are more relevant at pre-configuration time when a set of cloud endpoints are at least pre-configured to connect to a device, and some portions of the environment 100 are more relevant at a later connection time when the device actually requests to connect to one of the pre-configured cloud endpoints. First, the pre-configuration will be described with respect to FIGS. 2 through 5. Then, the subsequent connection from the device to one of the pre-configured endpoints (at connection time) will be described with respect to FIGS. 6 and 7. Finally, with respect to FIG. 8, a computing system will be described in which aspects described herein may be employed.

Figure 2:
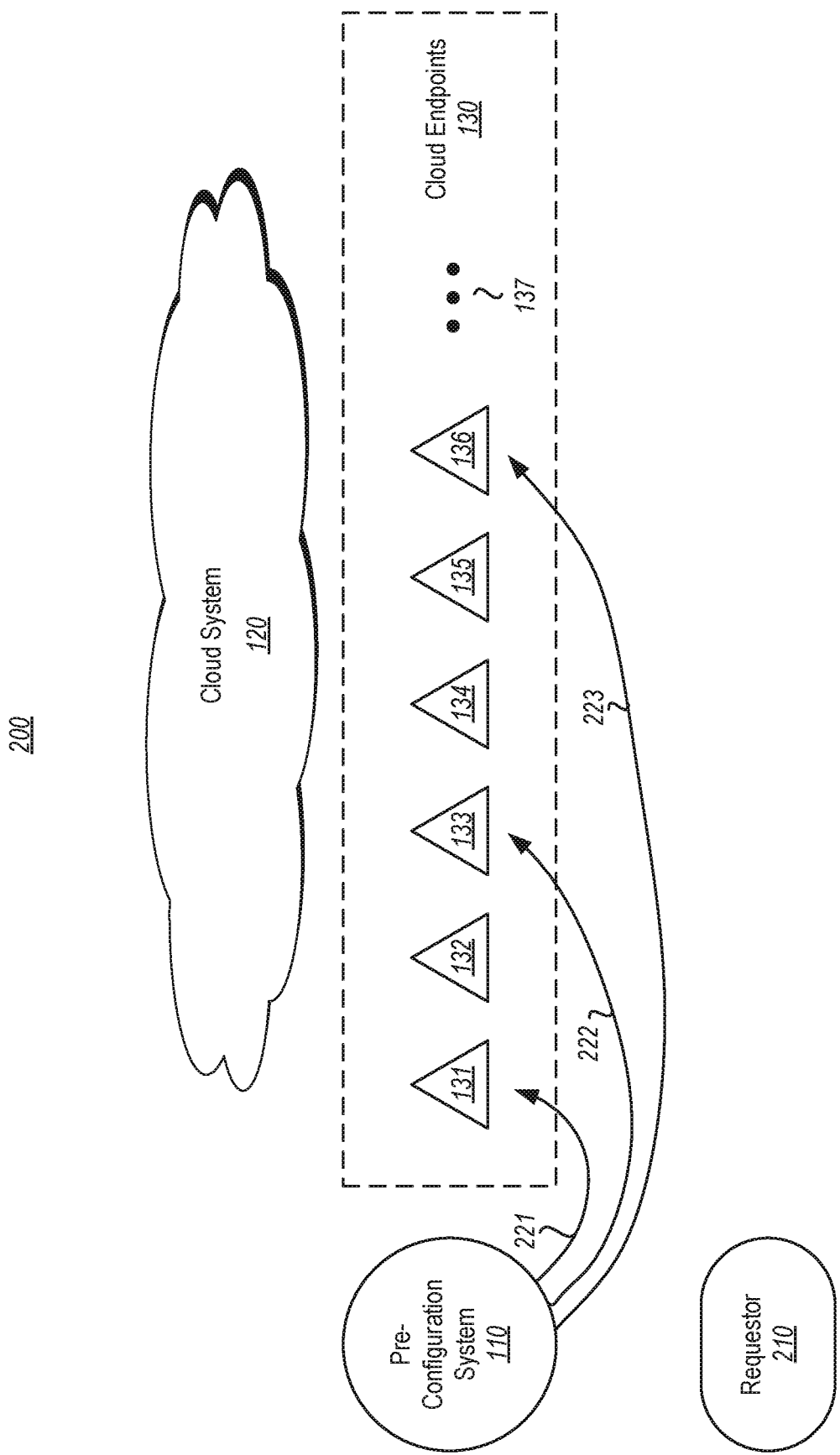
FIG. 2 illustrates a pre-configuration environment, which shows the portions of the environment of FIG. 1 that are more relevant to the performance of the pre-configuration process itself, and in which arrows represent various data flow associated with the pre-configuration.

FIG. 2 illustrates a pre-configuration environment 200, which shows the portions of the environment 100 that are more relevant to the performance of the pre-configuration process itself, and in which arrows represent various data flow associated with the pre-configuration. During pre-configuration, the pre-configuration component 110 and at least some of the cloud endpoints 130 collaborate to at least partially pre-configure the respective cloud endpoint for subsequent connection to the device 101. Though not shown in FIG. 1, the pre-configuration environment 200 includes a pre-configuration requesting system 210 that requests that the pre-configuration occur.

The pre-configuration system 110, the pre-configuration requesting system 210, and any given cloud endpoint 130 may each be executable components of a computing systems, and thus may each be structured as described below for the executable component 806 of the computing system 800 of FIG. 8. Furthermore, the pre-configuration system 110, the pre-configuration requesting system 210, and any given cloud endpoint 130 may be a computing system itself, and thus may be structured as described below for the computing system 800 of FIG. 8. The device 101 may be implemented exclusively as a hardware device. Alternatively, the device 101 may have software-based processing capability. Thus, the device 101 may be a computing system such as the computing system 800 described below with respect to FIG. 8.

Figure 3:
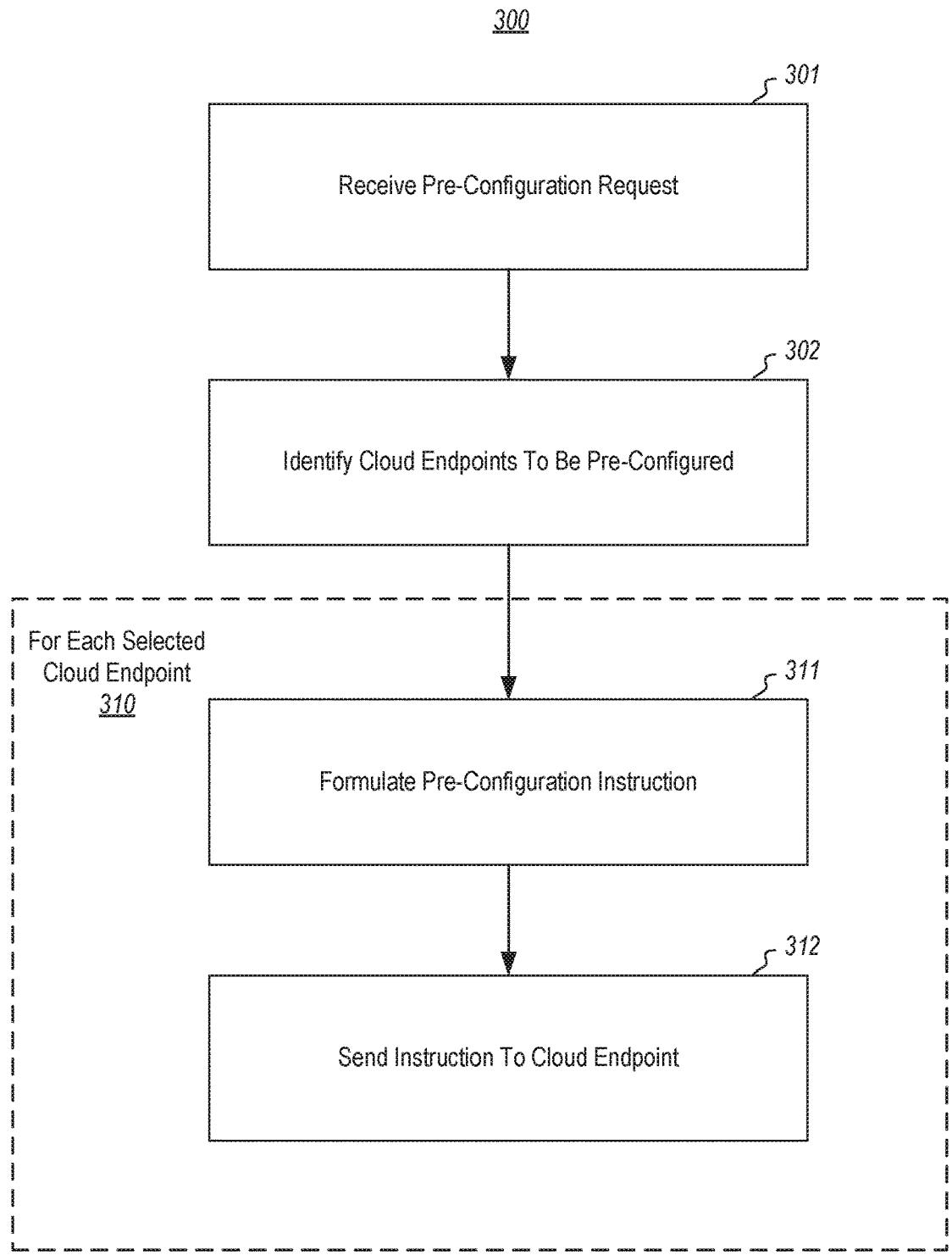
FIG. 3 illustrates a flowchart of a method to at least partially pre-configure a set of cloud endpoints for connection to a device, in accordance with the principles described herein.

FIG. 3 illustrates a flowchart of a method 300 to at least partially pre-configure a set of cloud endpoints for connection to a device, in accordance with the principles described herein. As the method 300 may be performed within the environment 200 of FIG. 2, the method 300 of FIG. 3 will now be described with frequent reference to the environment 200 of FIG. 2. Specifically, the method 300 may be performed by the pre-configuration system 110 of FIGS. 1 and 2, in order to at least partially pre-configure respective cloud endpoints to connect to the device 101.

The method 300 is initiated upon receiving a request that a plurality of cloud endpoints be pre-configured for connection to the device (act 301). Referring to FIG. 2, the pre-configuration requesting system 210 may issue a request (as represented by arrow 211) to the pre-configuration system 110. The pre-configuration request 211 need not specify the exact identity of the cloud endpoints that are to be at least partially pre-configured for connection to the device 101. However, the pre-configuration request 211 is structured such that when received and processed by the pre-configuration system 110, the pre-configuration system 110 is caused to perform the remainder of the method 300.

The principles described herein are not limited to the identity of the pre-configuration requesting system 210. As an example only, the pre-configuration requesting system 210 may be the device 101 itself. Alternatively, the pre-configuration requesting system 210 may be a system under the control of an enterprise that the device 101 belongs to, such as perhaps a system belonging to an Information Technology (IT) representative of a company that a user of the device 101 belongs to.

Figure 4:
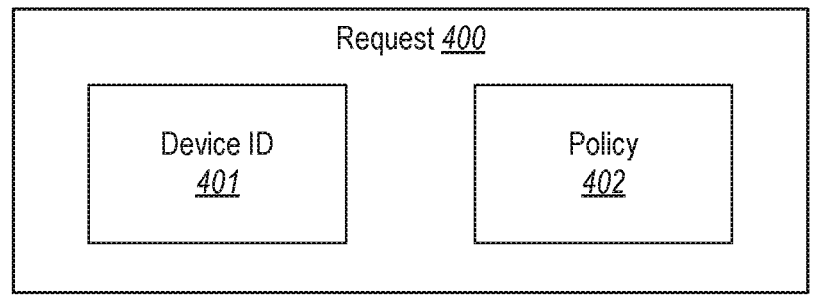
FIG. 4 illustrates an example request for cloud endpoints to be pre-configured for a device.

FIG. 4 illustrates an example request 400 that represents an example of the request 211 of FIG. 2. The request could be communicated according to any protocol, such as perhaps the Internet Protocol (IP) protocol. The request 400 includes a device identifier 401 that identifies the device for which cloud endpoints are going to be selected and pre-configured for connection. In this example, the device identifier 401 identifies the device 101.

Optionally, the request 400 may also include policy 402 identifying parameters that the pre-configuration system 110 should use in order to select appropriate cloud endpoints for pre-configuration. The policy could even include the identification of the cloud endpoints that are to be pre-configured for connection to the device 101. In that case, the logic associated with careful selection of the cloud endpoints could reside within the pre-configuration requesting system 210, instead of, or in addition to, the pre-configuration system 110.

Returning to the method 300 of FIG. 3, the pre-configuration system uses the request to identify a set of cloud endpoints that is to be at least partially pre-configured to establish a connection with the device (act 302). For example, the selection of the set of cloud endpoints may take into consideration the identity of the device identified by the device identifier 401 in the request 400. The selection may also consider the policy 402 expressed by the pre-configuration requesting system in the request 400, if there is any such policy. The selection may also take into consideration policy parameters that are known to the pre-configuration component itself independent of any information within the request 400 itself. Such policy can take into consideration security, privacy, and/or legal restrictions or criteria associated with allowing the particular identified device to connect with cloud endpoints.

The remainder 310 of the method 300 may be performed for each of the identified cloud endpoints that are to be pre-configured. The identified cloud endpoints will also be referred to herein as the "set of cloud endpoints". In the example of the device 101, suppose that cloud endpoints 131, 133 and 136 are identified as the set of cloud endpoints that are to be at least partially preconfigured for connection to the device 101. In this case, the remainder 310 of the method 300 may be performed for each of the set of cloud endpoints 131, 133 and 136.

Specifically, for cloud endpoint 131, the pre-configuration system 110 formulates a pre-configuration instruction that is structured such that when processed by the cloud endpoint 131, the cloud endpoint 131 is caused to establish device-specific connection configuration that is specific to the device 101 (act 311). That pre-configuration assists the cloud endpoint 131 to establish a connection with the device 101 upon request of the device 101. Optionally, the instruction also includes protocol data that the cloud endpoint 131 is to use when connecting to the identified device. The pre-configuration system 110 then causes the pre-configuration instruction (as represented by arrow 221 in FIG. 2) to be sent to the cloud endpoint 131. In response, the cloud endpoint 131 will at least partially pre-configure itself to connect to the device 101.

For cloud endpoint 133 (yet another of the cloud endpoints of the set of cloud endpoints), the pre-configuration system 110 formulates a pre-configuration instruction that is structured such that when processed by the cloud endpoint 133, the cloud endpoint 133 is caused to establish device-specific connection configuration that is specific to the device 101 (act 311). That pre-configuration assists the cloud endpoint 133 to establish a connection with the device 101 upon request of the device 101. Optionally, the instruction also including protocol data that the cloud endpoint 133 is to use when connecting to the identified device. The pre-configuration system 110 then causes the pre-configuration instruction (as represented by arrow 222 in FIG. 2) to be sent to the cloud endpoint 133. In response, the cloud endpoint 133 will at least partially pre-configure itself to connect to the device 101.

For cloud endpoint 136 (the last of the cloud endpoints of the set of cloud endpoints), the pre-configuration system 110 formulates a pre-configuration instruction that is structured such that when processed by the cloud endpoint 136, the cloud endpoint 136 is caused to establish device-specific connection configuration that is specific to the device 101 (act 311). That pre-configuration assists the cloud endpoint 136 to establish a connection with the device 101 upon request of the device 101. Optionally, the instruction also including protocol data that the cloud endpoint 136 is to use when connecting to the identified device. The pre-configuration system 110 then causes the pre-configuration instruction (as represented by arrow 223 in FIG. 2) to be sent to the cloud endpoint 136. In response, the cloud endpoint 136 will at least partially pre-configure itself to connect to the device 101.

Figure 5:
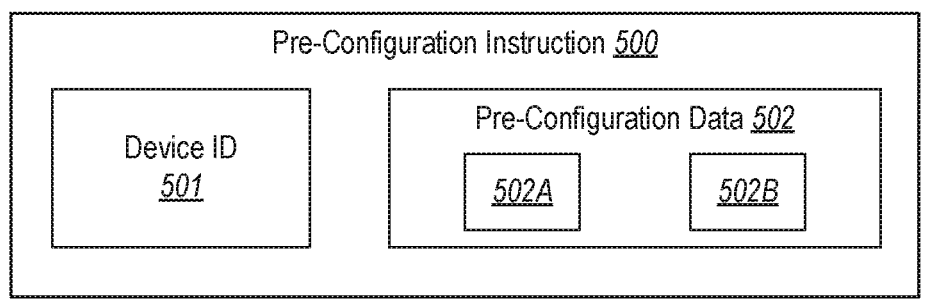
FIG. 5 illustrates an example pre-configuration instruction issued to cloud endpoints to cause them to at least partially pre-configured for connection to the device.

FIG. 5 illustrates a pre-configuration instruction 500 that represents an example of each of the pre-configuration instructions 221, 222 and 223 of FIG. 2. The pre-configuration instruction 500 includes a device identifier 501 that identifies the device (e.g., device 101) for which pre-configuration is to be performed. The pre-configuration instruction 500 also includes pre-configuration data 502 that could include device-specific configuration data 502A that is specific to the device 502. As an example, the device-specific configuration data 502A could include a public key of the device 101, a certificate of the device 101, or device-specific protocol information or settings. The pre-configuration data 502 may also include pre-configuration data 502B that is not specific to the device 101.

Thus, each of the selected cloud endpoints are at least partially pre-configured for connection to the device. There are at least two significant technical advantages here. First, the selection of the cloud endpoints may take into consideration security and privacy concerns, as well as other restrictions. Thus, the device is later connected to appropriate cloud endpoints considering security, privacy, and other restrictions. Furthermore, while there may still be some interaction between the device and the at least partially pre-configured cloud endpoint at later connection time, the amount of time to reconnect may be significantly reduced since the cloud endpoint already has much of the device-specific information that the cloud endpoint would otherwise have to acquire at connection time. Thus, the power and time required to establish a connection between the device and the cloud endpoint is reduced.

The pre-configuration system 110 may perform the method 300 multiple times for different devices. Some cloud endpoints may be appropriate for connection to one device, but not another. Accordingly, the pre-configuration system 110 may select a different set of cloud endpoints depending on the device that is being served. Thus, the pre-configuration system 110 performs device-specific custom selection of the cloud endpoints, and then custom pre-configuration of those cloud endpoints in a manner that is specific to the device.

Pre-configuration of a set of cloud endpoints for later connection to a device has just been described with respect to FIGS. 2 through 5. Now, connection time during which the device connects to the pre-configured cloud endpoint will be described with respect to FIGS. 6 and 7.

Figure 6:
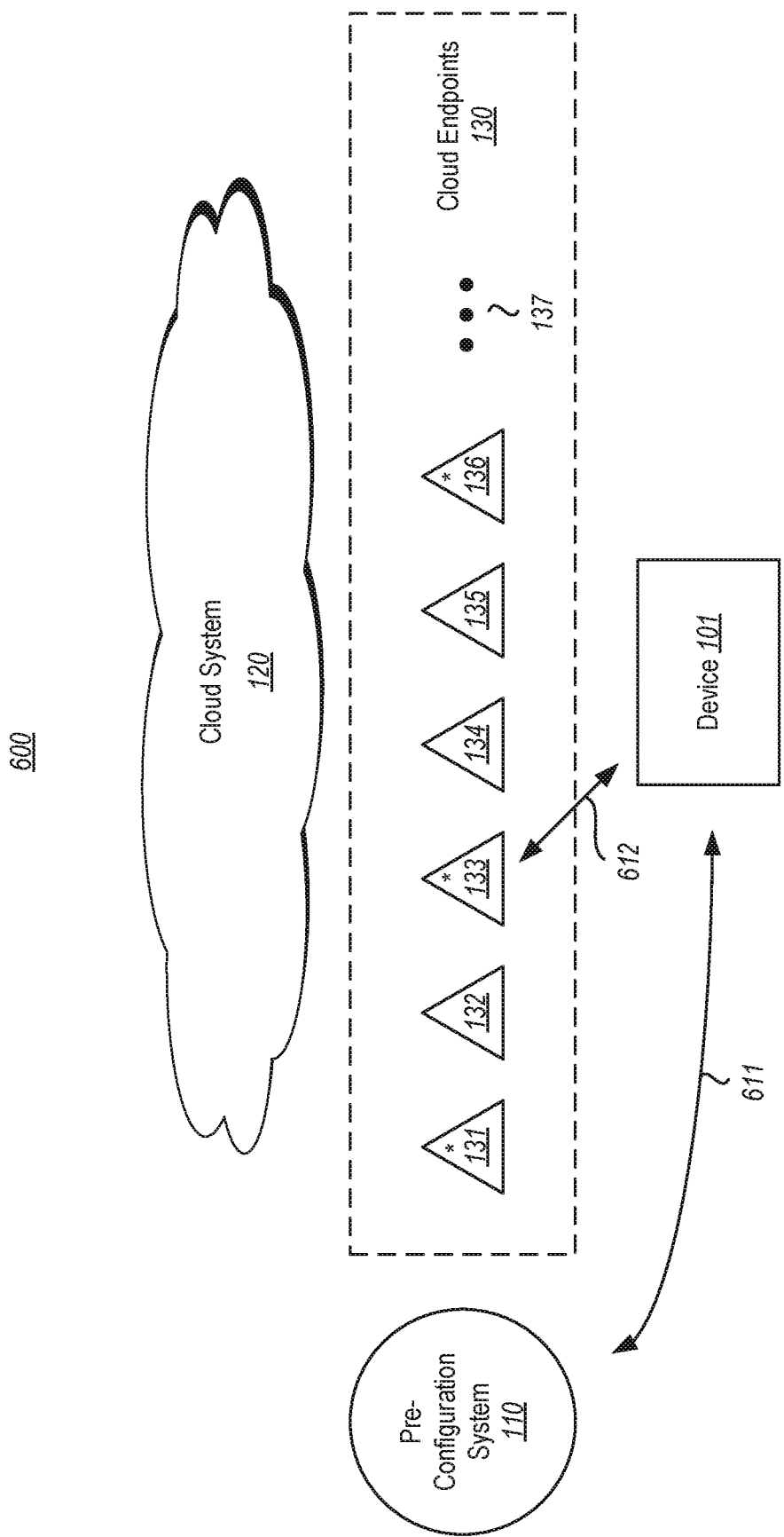
FIG. 6 illustrates a connection environment, which shows the portions of the environment of FIG. 1 that are more relevant to the performance of the connection to the cloud endpoint, and in which arrows represent various data flow associated with the connection.

FIG. 6 illustrates a connection environment 600, which shows the portions of the environment 100 that are more relevant to the performance of the connection to the cloud endpoint, and in which arrows represent various data flow associated with the connection. Connection time is after, and perhaps well after, the pre-configuration time. In FIG. 6, the cloud endpoints 131, 133 and 136 have an asterisk to emphasize that in the example described above and continued here, the cloud endpoints 131, 133 and 136 are each pre-configured (or are at least partially pre-configured) to establish a connection with the device 101. In short, the cloud endpoints 131, 133 and 136 are each at the ready to receive a connection request from the device 101.

During connection time, the device 101 connects (as represented by bi-directional arrow 612) to a selected one of the pre-configured cloud endpoints (here, the example will be the pre-configured cloud endpoint 133). Bi-directional arrow 611 indicates that there could be some collaboration between the pre-configuration system 110 and the device 101 in order to select the pre-configured cloud endpoint to which the device 101 is to connect.

Figure 7:
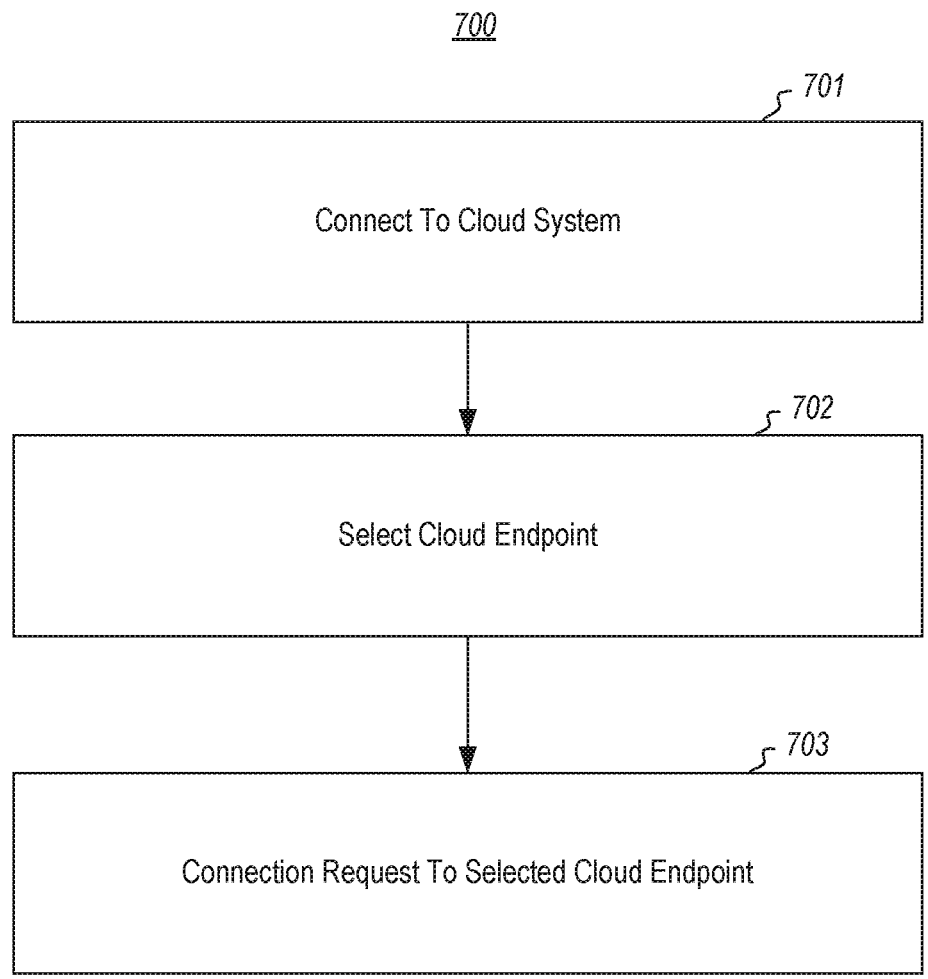
FIG. 7 illustrates a flowchart of a method for connecting to a cloud endpoint that is at least partially pre-configured to connect with the computing system, in accordance with the principles described herein.

FIG. 7 illustrates a flowchart of a method 700 for connecting to a cloud endpoint that is at least partially pre-configured to connect with the computing system, in accordance with the principles described herein. The method 700 may be performed by the device 101 of FIG. 6 in the environment 600 of FIG. 6. Accordingly, the method 700 of FIG. 7 will now be described with respect to the environment 600 of FIG. 6.

The device first determines that the device is to connect to a cloud computing environment (act 701). In the example of FIG. 6, the device 601 is to connect to the cloud system 120, and thus will connect via one of the cloud endpoints 130. In response to this determination, the device selects a cloud endpoint to connect to (act 702). In FIG. 6, the device 101 selects a cloud endpoint amongst the set of cloud endpoints 131, 133 and 136 that are each at least partially pre-configured for the device. In this example, the device 101 selects the cloud endpoint 133. Referring to FIG. 7, the device then causes a connection to be set to the selected cloud endpoint (act 703).

This connection request is represented by bi-directional arrow 612. This selection may be made in collaboration with the pre-configuration system 110, as represented by the bi-directional arrow 611. The selection may be based on at least one of a geographic location of the computing system and a network performance between the computing system and a particular cloud endpoint of the set of cloud endpoints.

More regarding how the device makes the selection of the endpoint to connect to will now be described. In one embodiment, the device 101 sends an endpoint list request to the pre-configuration system 110. In response, the pre-configuration system 110 causes an identification of a least a subset of the set of cloud endpoints to be sent back to the device 101. For instance, the pre-configuration system 110 may send a list that includes all of the pre-configured cloud endpoints 131, 133 and 136 to the device 101. The pre-configuration system 110 may also inform the device of what protocol and protocol parameters to use to connect to each of the cloud endpoints 131, 133 and 136. Thus, the device itself may itself select which of the cloud endpoints 131, 133 and 136 to connect to.

The selection of the cloud endpoint to connect to may be based on geographic location of the device. In this case, the device determines geographic data associated with the location of the device, reviews the list of pre-configured cloud endpoints, and selects the closest pre-configured cloud endpoint. In another embodiment, the list of pre-configured cloud endpoints will have a corresponding geographic area listed for each of the pre-configured cloud endpoints. In that case, if the device is within a particular geographic area of that cloud endpoint, that cloud endpoint is selected for connection.

This geography-based selection may be performed by the device itself in response to having the list of pre-configured endpoints, and knowing its own geographic location. Alternatively, the pre-configuration system 110 may make the selection based on geographic information received from the device 101. In particular, the device may send an endpoint request to the pre-configuration system along with geographic data representing a geographic location of the device, or perhaps the device just sends periodic notification to the pre-configuration system of the geographic location of the device. In response, the pre-configuration system selects the cloud endpoint for the device to connect to based on the geographic location. As an example, the pre-configuration system may select the pre-configuration system that is geographically closest to the device, or that has an associated geographic region in which the device now is. The pre-configuration system then sends an instruction to the device to connect to that selected cloud endpoint, and the device responds by issuing a connection request to that selected cloud endpoint.

As an alternative or in addition to selecting the pre-configured cloud endpoint to connect to based on geographic location of the device, the selection may be based on network performance criteria. That network performance criteria may be the network performance of a current connection of the device to a cloud endpoint, or the network performance of a connection to a candidate target cloud endpoint that the device may potentially switch to.

Here, the device may make its own selection if the device already has a list of pre-configured cloud endpoints. For instance, if the network performance of the connection between the device 101 and the cloud endpoint 133 drops below a certain performance threshold, the device 101 may communicate briefly with the other cloud endpoints 131 and 136 to see if the network performance of those communications are better, or are above a network performance threshold. If the network performance would be better by switching to one of the other cloud endpoints 131 and 136, the device may select that cloud endpoint, and make the connection request to that cloud endpoint.

The pre-configuration system 110 may alternatively make this decision using network performance data received from the device, which could be the network performance data of the current connection between the device and one of the cloud endpoints, and/or a network performance between the device and a potential target cloud endpoint. As an example, if the pre-configuration system 110 determines that the network performance of the connection between the device 101 and the cloud endpoint 133 has dropped below a certain threshold, and pre-configuration system 110 may use the network performance of potential connections between the device 101 and one of the other cloud endpoints 131 and 136 to select which of the cloud endpoints 131 and 136 the device should switch to. The pre-configuration system 110 could then send an instruction to the device to connect instead to that new target cloud endpoint, causing the device to make the connection request to the new cloud endpoint.

As time passes, the appropriate set of cloud endpoints may change due to emerging or declining security or privacy concerns, or due to new or more stringent restrictions, or removal or lessening of restrictions. In that case, the method 500 may essentially be repeated to reselect the appropriate set of endpoints. Now, however, instead of sending a pre-configuration instruction to each of the cloud endpoints in the set of cloud endpoints, the pre-configuration system may then just detect which cloud endpoint(s) are to be deleted from the set, and which are to be added to the set. The pre-configuration system may then just send to those cloud endpoint(s) to be deleted from the set (also called herein a "deletion cloud endpoint") an instruction to de-configure with respect to the device. Additionally, the computing system may then just send to those cloud endpoints that are to be added to the set (also called herein "addition cloud endpoints") an instruction to pre-configure for connection to the device.

Accordingly, the principles described herein allow for the appropriate selection of cloud endpoints to be used when a device connects to a cloud system, the pre-configuration of that set of selected cloud endpoints, and the rapid and efficient connection of the device to any of those pre-configured cloud endpoints. Because the principles described herein are performed in the context of a computing system, some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
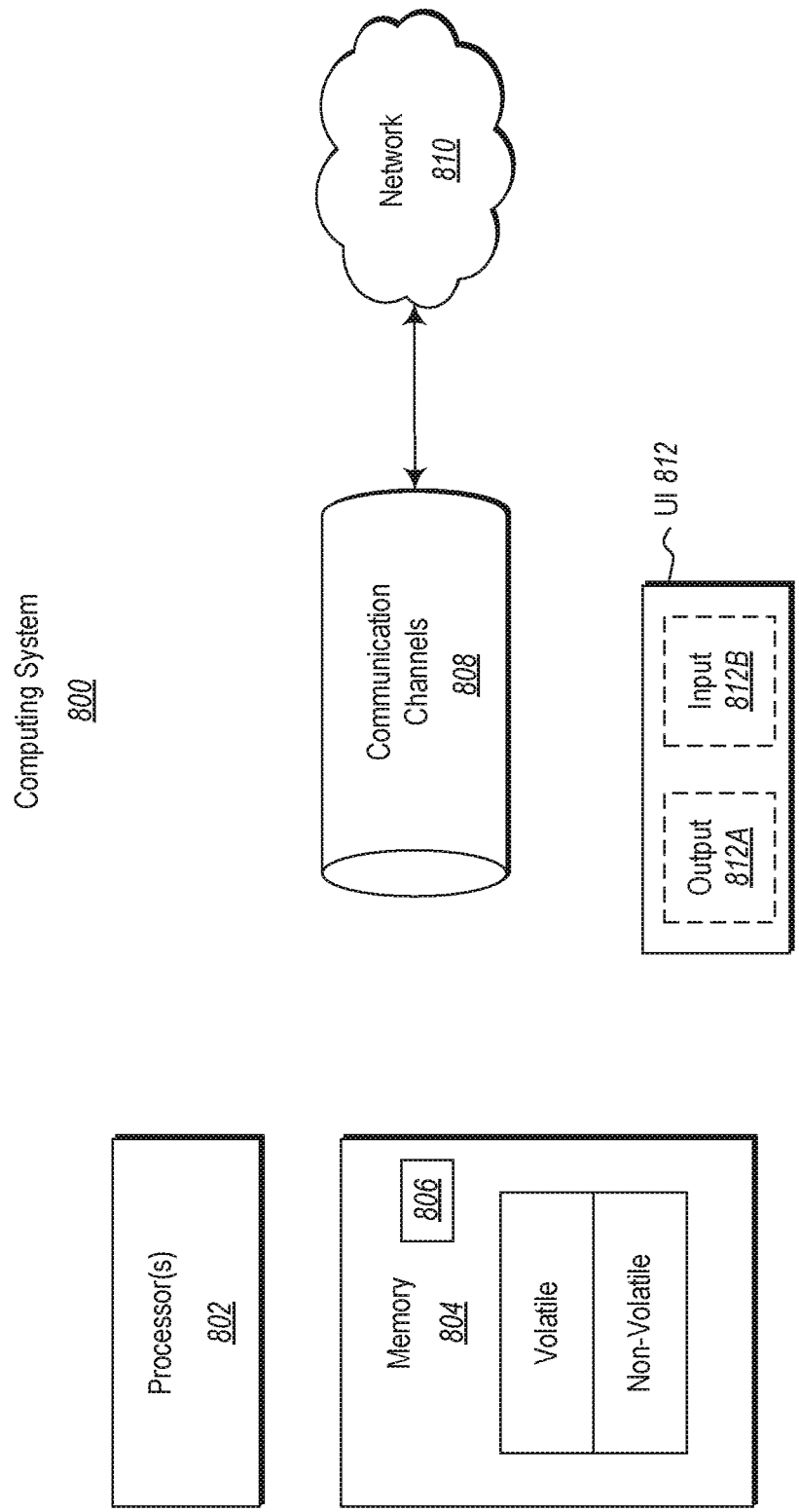
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that pre-configures a set of cloud endpoints to facilitate a subsequent connection between a device and any one of the cloud endpoints in the set, where the subsequent connection between the device and the one cloud endpoint occurs after the set of cloud endpoints are pre-configured, the computing system comprising:
   one or more processors; and
   one or more computer-readable media having thereon instructions that are executable by the one or more processors to cause the computing system to:
      receive a request indicating that the set of cloud endpoints be pre-configured to facilitate the subsequent connection involving the device, wherein the subsequent connection occurs after the set of cloud endpoints are pre-configured;
      formulate a pre-configuration instruction that is structured to be interpretable by the cloud endpoints in the set to establish corresponding device-specific connection configurations that are specific to the device, wherein the pre-configuration instruction is structured to assist the cloud endpoints in the set to establish the subsequent connection with the device upon a subsequent request of the device;
      cause the pre-configuration instruction to be sent to the cloud endpoints in the set, wherein the cloud endpoints in the set are pre-configured prior to the subsequent connection with the device being made;
      receive performance data from the device, wherein the performance data includes data describing a network performance between the device and an endpoint that the device is currently connected to, and wherein the network performance relates to a number of communication retries that occur for communications between the device and the endpoint;
      determine that the number of communication retries described in the performance data fails to satisfy a threshold such that the subsequent connection with a target endpoint that has been pre-configured is to be triggered; and
      based on the number of communication retries failing to satisfy the threshold, trigger the subsequent connection by sending an instruction to the device, the instruction instructing the device to connect to the target cloud endpoint, which is included in the set of cloud endpoints, the target cloud endpoint having already been pre-configured for the device.

2. The computing system in accordance with claim 1, wherein execution of the instructions further causes the computing system to perform the following in response to receiving an endpoint list request from the device after the computing system has caused the pre-configuration instruction to be sent to each cloud endpoint of the set of cloud endpoints:
   cause an identification of at least a subset of the set of cloud endpoints to be sent to the device.

3. The computing system in accordance with claim 1, wherein execution of the instructions further causes the computing system to perform the following in response to receiving an endpoint list request from the device:
   for at least one of the cloud endpoints of the set of cloud endpoints, identify protocol data that is used when connecting to the identified cloud endpoint and cause the protocol data to be sent to the device.

4. The computing system in accordance with claim 1, the wherein execution of the instructions further causes the computing system to perform the following in response to receiving an endpoint request from the device after the computing system has caused the pre-configuration instruction to be sent to each cloud endpoint of the set of cloud endpoints:
   cause an instruction to connect to a cloud endpoint of the set of cloud endpoints to be sent to the device, the instruction including an identification of the cloud endpoint to connect to.

5. The computing system in accordance with claim 4, the instruction also including protocol data to use when connecting to the identified cloud endpoint.

6. The computing system in accordance with claim 1, wherein execution of the instructions further causes the computing system to perform the following in response to receiving geographic data from the device representing a geographic location of the device after the computing system has caused the pre-configuration instruction to be sent to each cloud endpoint of the set of cloud endpoints:
   based at least upon the geographic data, cause the instruction to connect to the target cloud endpoint of the set of cloud endpoints to be sent to the device.

7. The computing system in accordance with claim 1, wherein execution of the instructions further causes the computing system to identify which cloud endpoints are using security criteria and/or privacy criteria.

8. The computing system in accordance with claim 1, wherein execution of the instructions further causes the computing system to perform the following:
   determine that a change is to be made in the set of cloud endpoints, said change including deleting at least one deletion cloud endpoint of the cloud endpoints from the set of cloud endpoints; and
   cause a deletion instruction to be sent to each of the at least one deletion cloud endpoints that is to be deleted from the set of cloud endpoints, the deletion instruction being structured to be interpretable by each of the deletion cloud endpoints to cause the respective deletion cloud endpoint to remove at least some device-specific configuration information that is specific to the device.

9. The computing system in accordance with claim 1, wherein execution of the instructions further causes the computing system to perform the following:
   determine that a change is to be made in the set of cloud endpoints, said change including adding at least one addition cloud endpoint to the set of cloud endpoints; and
   cause the pre-configuration instruction to be sent to each of the at least one addition cloud endpoint that is to be added to the set of cloud endpoints.

10. A computer-implemented method for pre-configuring a set of cloud endpoints to facilitate a subsequent connection between a device and any one of the cloud endpoints in the set, where the subsequent connection between the device and the one cloud endpoint occurs after the set of cloud endpoints are pre-configured, the method comprising:
- receiving a request indicating that the set of cloud endpoints be pre-configured to facilitate the subsequent connection involving the device, wherein the subsequent connection occurs after the set of cloud endpoints are pre-configured;
- formulating a pre-configuration instruction that is structured to be interpretable by the cloud endpoints in the set to establish corresponding device-specific connection configurations that are specific to the device, wherein the pre-configuration instruction is structured to assist the cloud endpoints in the set to establish the subsequent connection with the device upon a subsequent request of the device;
- sending the pre-configuration instruction to the cloud endpoints in the set, wherein the cloud endpoints in the set are pre-configured prior to the subsequent connection with the device being made;
- receiving performance data from the device, wherein the performance data includes data describing a network performance between the device and an endpoint that the device is currently connected to, and wherein the network performance relates to a number of communication retries that occur for communications between the device and the endpoint;
- determining that the number of communication retries described in the performance data fails to satisfy a threshold such that the subsequent connection with a target endpoint that has been pre-configured is to be triggered; and
- based on the number of communication retries failing to satisfy the threshold, triggering the subsequent connection by sending an instruction to the device, the instruction instructing the device to connect to the target cloud endpoint, which is included in the set of cloud endpoints, the target cloud endpoint having already been pre-configured for the device.

11. The computer-implemented method in accordance with claim 10, the device being a first device, the set of cloud endpoints being a first set of cloud endpoints, the pre-configuration instruction being a first pre-configuration instruction, the method further comprising:
- receiving a network request that a plurality of cloud endpoints be pre-configured for connection to a second device;
- using the request to identify a second set of cloud endpoints that are to be at least partially pre-configured to establish a connection with the second device;
- formulating a second pre-configuration instruction that is structured to be interpretable by the cloud endpoints of the second set of cloud endpoints to establish device-specific connection configuration that is specific to the second device, the second pre-configuration instruction structured to assist the respective cloud endpoint of the second set of cloud endpoints to establish a connection with the second device upon request of the device; and
- sending the second pre-configuration instruction to each cloud endpoint of the second set of cloud endpoints.

12. A computing system that pre-configures a set of cloud endpoints to facilitate a subsequent connection between a device and any one of the cloud endpoints in the set, where the subsequent connection between the device and the one cloud endpoint occurs after the set of cloud endpoints are pre-configured, the computing system comprising:
- one or more processors; and
- one or more computer-readable media having thereon instructions that are executable by the one or more processors to cause the computing system to:
  - determine that the computing system is to connect to a cloud computing environment, which includes a set of pre-configured cloud endpoints;
  - in response to the determination that the computing system is to connect to the cloud computing environment, select a cloud endpoint to connect to amongst the set of pre-configured cloud endpoints that are each at least partially pre-configured with system-specific configuration information specific to the computing system, the selection based on at least one of a geographic location of the computing system and a network performance between the computing system and a particular cloud endpoint of the set of cloud endpoints;
  - cause a connection request to be sent to the selected cloud endpoint, wherein the pre-configured cloud endpoints are pre-configured prior to the subsequent connection with the device being made;
  - receive performance data from the device, wherein the performance data includes data describing a network performance between the device and the selected cloud endpoint, which the device is connected to, and wherein the network performance relates to a number of communication retries that occur for communications between the device and the selected cloud endpoint;
  - determine that the number of communication retries described in the performance data fails to satisfy a threshold such that a subsequent connection with a target endpoint that has been pre-configured is to be triggered; and
  - based on the number of communication retries failing to satisfy the threshold, trigger the subsequent connection by sending an instruction to the device, the instruction instructing the device to connect to the target cloud endpoint, which is included in the set of cloud endpoints, the target cloud endpoint having already been pre-configured for the device.

13. The computing system in accordance with claim 12, the computer-executable instructions being further structured such that, if executed by the one or more processors, the selection is performed based on the geographic location of the computing system.

14. The computing system in accordance with claim 12, the computer-executable instructions being further structured such that, if executed by the one or more processors, the computing system would select the cloud endpoint by being configured to do the following:
- determining geographic data associated with the geographic location of the computing system.

15. The computing system in accordance with claim 12, the computer-executable instructions being further structured such that, if executed by the one or more processors, the selection is performed based on the network performance between the particular cloud endpoint and the computing system.

16. The computing system in accordance with claim 15, the computer-executable instructions being further structured such that, if executed by the one or more processors, the computing system would select the cloud endpoint by being configured to do the following:

determining the network performance between the computing system and the particular cloud endpoint of the set of cloud endpoints.

17. The computing system in accordance with claim 14, the computer-executable instructions being further structured such that, if executed by the one or more processors, the computing system would select the cloud endpoint by being configured to do the following:
determining the network performance between the computing system and the particular cloud endpoint of the set of cloud endpoints.

* * * * *